United States Patent [19]
Ban

[11] Patent Number: 5,440,349
[45] Date of Patent: Aug. 8, 1995

[54] COLOR SIGNAL DEMODULATION CIRCUIT AND METHOD THEREFOR

[75] Inventor: Young-gyun Ban, Seoul, Rep. of Korea

[73] Assignee: Samsung Electronics Co., Ltd., Kyungki-do, Rep. of Korea

[21] Appl. No.: 202,426

[22] Filed: Feb. 28, 1994

[30] Foreign Application Priority Data

Feb. 26, 1993 [KR] Rep. of Korea ................ 93-2762

[51] Int. Cl.$^6$ ............................................ H04N 9/66
[52] U.S. Cl. ..................................... 348/638; 348/506
[58] Field of Search ............... 348/638, 641, 639, 640, 348/727, 506, 507; 358/23; H04N 9/66, 9/45, 9/455, 5/455

[56] References Cited

U.S. PATENT DOCUMENTS

| | | | |
|---|---|---|---|
| 4,642,675 | 2/1987 | Gassmann | 348/638 |
| 4,692,889 | 9/1987 | McNeely | 348/641 |
| 5,093,723 | 3/1992 | Yang | 348/638 |

FOREIGN PATENT DOCUMENTS 0399758 11/1990 European Pat. Off. ....... H04N 5/91

Primary Examiner—James J. Groody
Assistant Examiner—Sherrie Hsia
Attorney, Agent, or Firm—Sughrue, Mion, Zinn, Macpeak & Seas

[57] ABSTRACT

A color signal demodulation circuit demodulates a color signal in correspondence with different chrominance subcarrier frequencies. The input color signal is delayed by $\pi/2$ using a so-called Hilbert transformer and the carrier signal for use in the demodulation is generated from a carrier generator. The input color signal and the carrier signal are selectively multiplied and added so as to demodulate a color difference signal of the desired baseband, to thereby correspond to the chrominance subcarriers having different frequencies while simplifying the hardware. A method for demodulating the chrominance signal, which method is particularly adapted to the demodulation circuit is also detailed.

11 Claims, 3 Drawing Sheets

COLOR SIGNAL DEMODULATION CIRCUIT AND METHOD THEREFOR

BACKGROUND OF THE INVENTION

1. Field of the Invention

The present invention relates to a color signal demodulation circuit and, more particularly, to a color signal demodulation circuit which can demodulate a modulated color signal corresponding to the different chrominance subcarrier frequencies. A corresponding demodulation method is also disclosed.

Korean Patent Application No. 93-2762 is incorporated herein by reference for all purposes.

2. Discussion of Related Art

In the conventional color signal demodulation circuit, an input color signal ($\omega_{sc}+\omega_m$) are multiplied with the carrier signal for use in demodulation having the same frequency ($\omega_{sc}$) with the subcarrier of an input color signal. Then, the unnecessary second harmonic signal is removed by a low-pass filter, to thereby demodulate the color difference signal R-Y and B-Y or baseband frequencies. This process can be explained in more detail with reference to FIG. 1.

FIG. 1 is a block diagram of the conventional color signal demodulation circuit, wherein only the color burst signal is output via a burst gate 10 among all of the input color signals after being separated into luminance and chrominance signals and sampled.

The color burst signal output from burst gate 10 is applied to a phase difference detector 20, where its phase is compared with that of a carrier signal generated and fed back from a downstream carrier generator 30. The phase difference resulting from the comparison is output as a voltage signal to carrier generator 30, which oscillates at 3.58 MHz, i.e., the color subcarrier frequency, in the case of an exemplary NTSC system. As a result, first and second carrier signals ($\sin\omega_{sc}t$ and $\cos\omega_{sc}t$) for use in the demodulation are output.

In a color difference signal demodulator 40, the first and second carrier signals which are for use in demodulation which are output from carrier generator 30, are input. The fw1 color signal input via a modulated color signal input terminal is demodulated into color difference signals. In a first multiplier 41, the first carrier signal for use in the demodulation output from carrier generator 30 and the input modulated color signal (C) are multiplied, and the output signal of first multiplier 41 is output as the R-Y signal after filtering in first low-pass filter 43.

In a second multiplier 42, the input modulated color signal (C) and the second carrier signal for use in the demodulation are multiplied, and the output signal of second multiplier 42 is output as the B-Y signal by a serially connected second low-pass filter 44.

When various kinds of input color signals, whose carrier frequency and bandwidth are different, are to be processed, low-pass filters, which respectively correspond to the subcarriers of the color signals to be demodulated, are needed for use as a rear stage of the demodulation circuit.

For example, the frequency characteristic of an input signal X is shown in FIG. 2A, assuming that the signal X has a center frequency $\omega_{sc}$ of 1 MHz and a bandwidth $\omega_m$ of 2 MHz. Furthermore, the frequency characteristic of an input signal Y is shown in FIG. 2B, assuming that the signal Y has a center frequency $\omega_{sc}$ of 2 MHz and a bandwidth $\omega_m$ of 4 MHz.

When a 1 MHz carrier signal for use in demodulation is multiplied with the X-signal, the frequency characteristic shown in FIG. 2C is generated. Meanwhile, a 2 MHz carrier signal for use in the demodulation is multiplied with the Y-signal, and the frequency characteristic shown in FIG. 2D is generated.

Accordingly, a low-pass filter whose cut-off frequency is 1 MHz is used to produce the final X-signal, and a low-pass filter whose cut-off frequency is 2 MHz is used to produce the final Y-signal, thereby demodulating an original signal.

It will be noted that, when the frequencies of carriers of input color signals are different, other low-pass filters having different cut-off frequencies, respectively, are absolutely necessary. Therefore, component sharing between circuits is impossible. The number of circuits has to be enlarged in order to support a varied manufacturing facility. Furthermore, interchangeability with other systems is poor.

An FM demodulation device is disclosed in EP 399758, where FM demodulation device delays the phase of an FM-modulated signal using a so-called Hilbert transformer, to thereby remove the undesirable high frequency component which is higher than the carrier signal by a predetermined multiple using a low-pass filter, while improving the S/N ratio. Since the low-pass filter, which removes the high frequency component higher than the carrier signal by two times, is used in demodulating the modulated signal in the above-mentioned device, this device also dictates the use of low-pass filters having varying cut-off frequencies depending on the frequency of the carrier signal.

SUMMARY OF THE INVENTION

Accordingly, an objective of the present invention is to provide a color signal demodulation circuit which demodulates a color signal without adjusting the hardware, while adapting to input color signals having different chrominance subcarriers.

Another objective of the present invention is to provide a color signal demodulation method which can be achieved by the above-mentioned demodulation circuit.

These and other objects and features of the present invention are provided by color signal demodulation circuit for demodulating an input modulated color signal using a carrier signal, including:

a carrier generator for generating a first carrier signal having sine component and a second carrier signal having cosine component which are synchronized with a burst signal contained in the color signal;

a phase delay for phase delaying the input color signal;

a first demodulator for demodulating a B-Y color difference signal of the baseband using the result of multiplying the input color signal with the first carrier signal and the result of multiplying a delayed color signal output from the phase delay means with the second carrier signal; and a second demodulator for demodulating a R-Y color difference signal of the baseband using the results of multiplying the input color signal with the second carrier signal and the result of multiplying the delayed color signal with the first carrier signal.

These and other objects, features and advantages of the present invention are provided by a color signal demodulation method for demodulating the input modulated color signal using a carrier signal, the method including steps for:

(a) generating a first carrier signal having a sine component and a second carrier having a cosine component, each of which are synchronized with a burst signal included in an input color signal and a cosine wave-shaped second carrier signal;

(b) phase delaying of the input color signal;

(c) demodulating a B-Y color difference signal of the baseband using the result of multiplying the input color signal with the first carrier signal and the result of multiplying a delayed color signal output from the step (b) with the second carrier signal; and (d) demodulating an R-Y color difference signal of the baseband using the result of multiplying the input color signal with the second carrier signal and the result of multiplying the delayed color signal with the first carrier signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENTS

Figure 1:
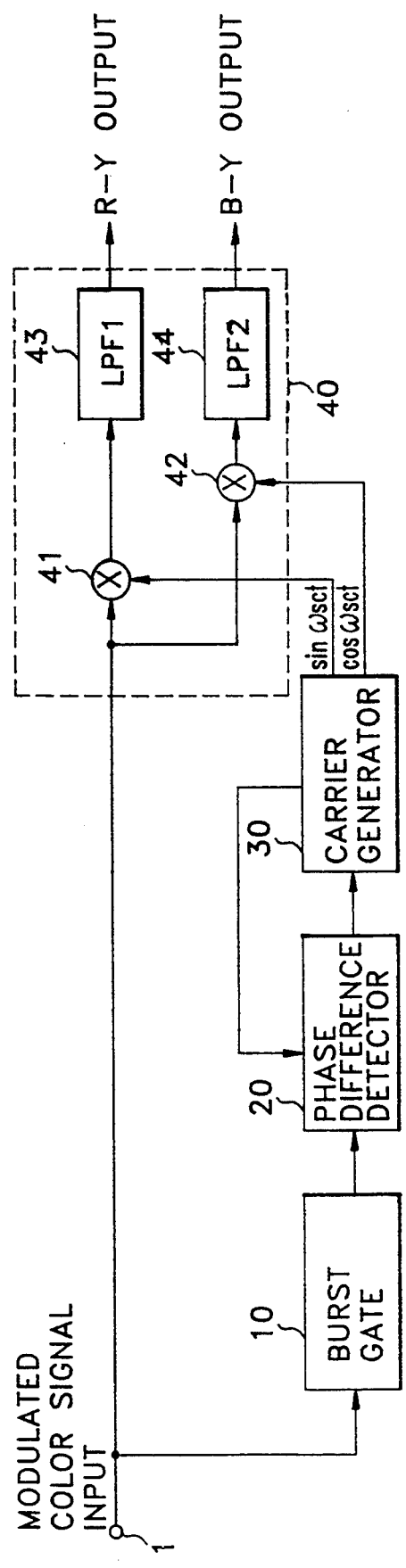
FIG. 1 is a block diagram showing the conventional color signal demodulation circuit.
Figure 3:
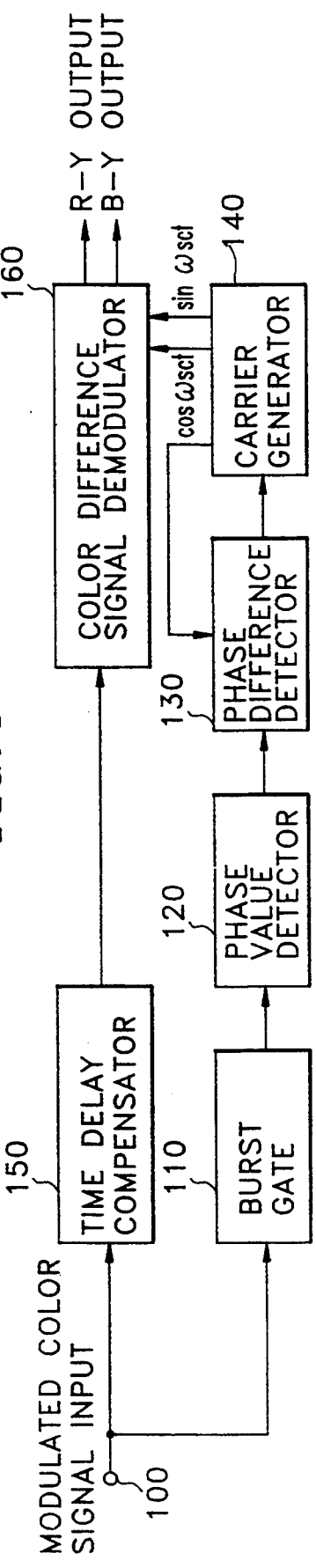
FIG. 3 is a high level block diagram which is useful in explaining the operation of an embodiment of a color signal demodulation circuit according to the present invention.
Figure 2B:
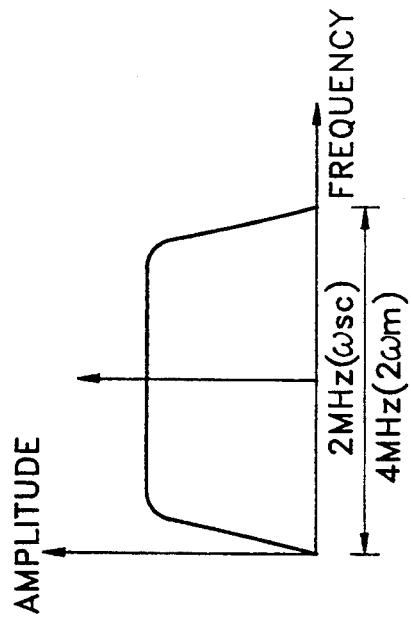
FIG. 2A through FIG. 2D are graphs for explaining the function of the low-pass filters shown in FIG. 1.
Figure 2D:
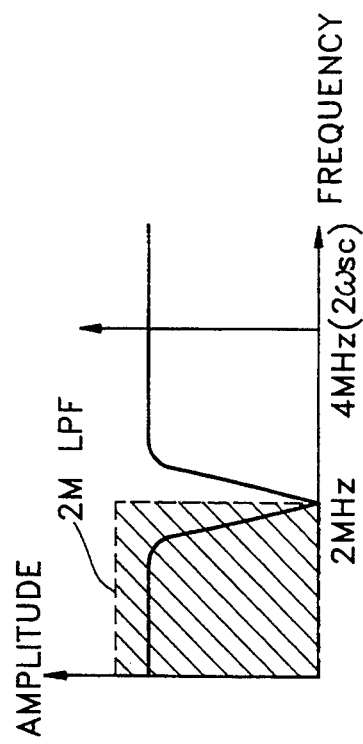
Figure 2A:
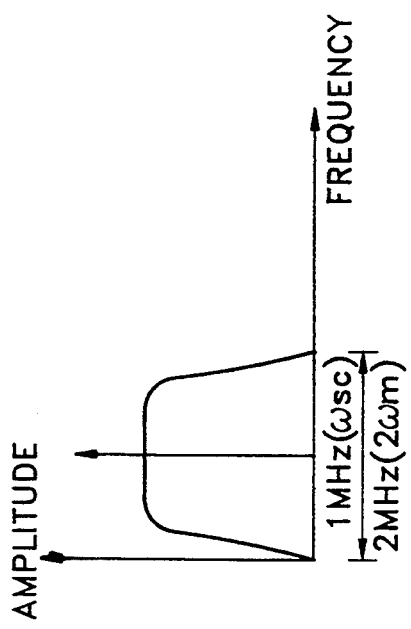
Figure 2C:
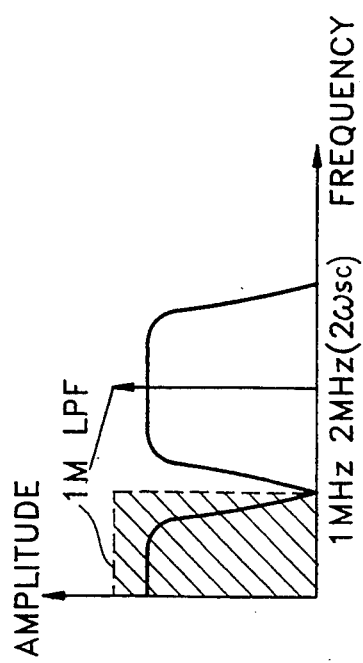

FIG. 3 is a block diagram showing a preferred embodiment of a color signal demodulation circuit according to the present invention.

A burst gate 110 and a time delay compensator 150 are commonly connected to a modulation color signal input terminal 100. An input terminal of a phase value detector 120 is connected to an output terminal of burst gate 110, while an output terminal of the phase value detector 120 is connected to a first input terminal of a phase difference detector 130.

An input terminal of a carrier generator 140 is, in turn, connected to an output terminal of phase difference detector 130, and a first output terminal of carrier generator 140 is connected to a second input terminal of phase difference detector 130, and second and third output terminals of carrier generator 140 are respectively connected to second and third input terminals of a color difference signal demodulator 160.

A first input terminal of color difference signal demodulator 160 is connected to an output terminal of time delay compensator 150, while first and second output terminals of color signal demodulator 160 are respectively connected to the external terminals which respectively output R-Y and B-Y color difference signals.

Figure 4:
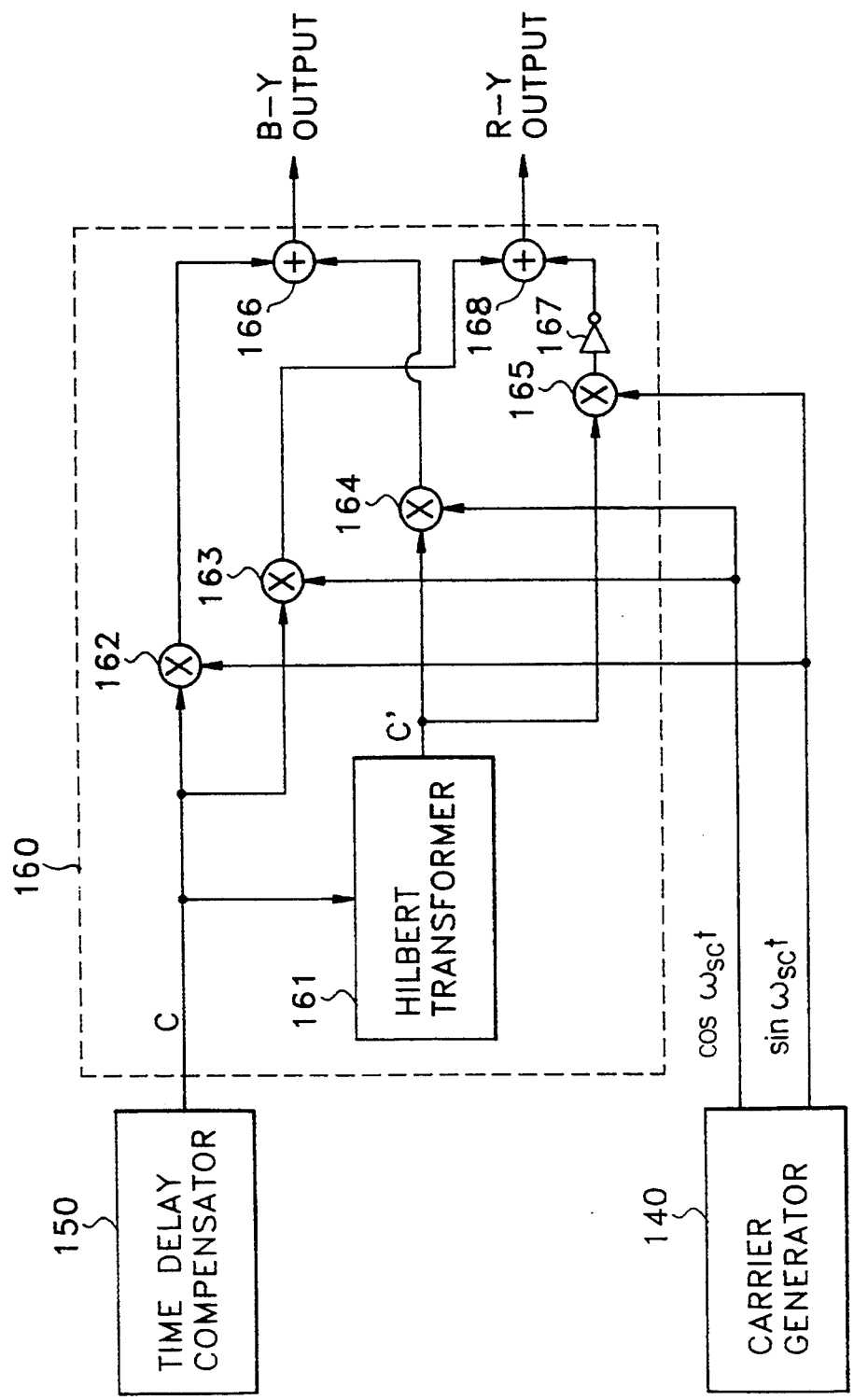
FIG. 4 is a detailed circuit diagram illustrating the color difference signal demodulator shown in FIG. 3.

FIG. 4 is a detailed circuit diagram showing the color difference signal demodulator shown in FIG. 3.

Color difference signal demodulator 160 includes a so-called Hilbert transformer 161 which is connected to the output terminal of time delay compensator 150, a first multiplier 162 whose first input terminal is connected to the output terminal of time delay compensator 150 and whose second input terminal is connected to the second output terminal of carrier generator 140, a second multiplier 163 whose first input terminal is connected to the output terminal of time delay compensator 150 and whose second input terminal is connected to the third output terminal of carrier generator 140, a third multiplier 164 whose first input terminal is connected to the output terminal of Hilbert transformer 161 and whose second input terminal is connected to the third output terminal of carrier generator 140, a fourth multiplier 165 whose first input terminal is connected to the output terminal of Hilbert transformer 161 and whose second input terminal is connected to the second output terminal of carrier generator 140. Preferably, a first adder 166, whose first input terminal is connected to the output terminal of first multiplier 162 and whose second input terminal is connected to the output terminal of third multiplier 164 is also included. An inverter 167 is advantageously connected to the output terminal of fourth multiplier 165. A second adder 168 whose first input terminal is connected to the output terminal of second multiplier 163 and whose second input terminal is connected to the output terminal of inverter 167 is also provided.

The operation of the color signal demodulation circuit shown in FIG. 3 will be explained below, with reference to FIGS. 3 and 4.

Referring to FIG. 3, the modulated color signal C is input to time delay compensator 150 and to burst gate 110 simultaneously. The color signal input at this time is, for example, a balance-modulated signal.

Time delay compensator 150 which advantageously may consist of a latch or delay, delays the input modulated color signal and outputs the delayed signal to color difference signal demodulator 160 so as to compensate for the signal processing delay time seen from the input terminal burst gate 110 to the output terminals of carrier generator 140.

Burst gate 110 outputs only the color burst signal loaded on the modulated color signal. Phase value detector 120 advantageously detects the standard point value of the color burst signal output from burst gate 110 while phase difference detector 130 compares the phase value of the color burst detected by phase value detector 120 with that of the carrier signal fed back from carrier generator 140, so that the phase difference corresponding to the difference between the phases is detected and provided to carrier generator 140.

In carrier generator 140, the phase difference detected in phase difference detector 130 is added to the carrier signal currently being generated, and then, the carrier signals which are synchronized with input color signal C, is generated and output to color signal demodulator 160.

In color signal demodulator 160, color signal C, i.e., an output signal of time delay compensator 150, is input and demodulated as described in detail below.

The modulated color signal C input to color signal input terminal 100 can be expressed as follows.

$$C = Cb(\sin \omega_{sc} t) + Cr(\cos \omega_{sc} t) \qquad (1)$$

wherein C is a color signal, Cb is the B-Y signal and Cr is the R-Y signal.

Signal C′, which results from delaying color signal C by $\pi/2$, can be expressed as follows.

$$C' = Cb(\cos \omega_{sc}t) - Cr(\sin \omega_{sc}t) \quad (2)$$

wherein C' is a color signal which is transformed by $\pi/2$ in a Hilbert transformer 161. Hilbert transformer 161 filters the entire band signal without attenuation, while only shifting the phase.

First multiplier 162 multiplies color signal C by the carrier signal $(\sin\omega_{sc}t)$ for use in the demodulation input from the second output terminal of carrier generator 140. This can be expressed as follows.

$$\begin{aligned}C(\sin\omega_{sc}t) &= Cb(\sin\omega_{sc}t)\sin\omega_{sc}t + Cr(\cos\omega_{sc}t)\sin\omega_{sc}t \quad (3)\\ 2C(\sin\omega_{sc}t) &= -Cb(\cos2\omega_{sc}t) + Cb(\cos 0) +\\ &\quad Cr(\sin2\omega_{sc}t) + Cr(\sin 0)\\ &= -Cb(\cos2\omega_{sc}t) + Cr(\sin2\omega_{sc}t) + Cb\end{aligned}$$

Third multiplier 164 multiplies $\cos\omega_{sc}t$ with color signal C' which is transformed by $\pi/2$ by Hilbert transformer 161. This can be expressed as follows.

$$\begin{aligned}C'(\cos\omega_{sc}t) &= Cb(\cos\omega_{sc}t)\cos\omega_{sc}t - Cr(\sin\omega_{sc}t)\cos\omega_{sc}t \quad (4)\\ 2C(\cos\omega_{sc}t) &= Cb(\cos2\omega_{sc}t) + Cb(\cos 0) -\\ &\quad Cr(\sin2\omega_{sc}t) - Cr(\sin 0)\\ &= Cb(\cos2\omega_{sc}t) - Cr(\sin2\omega_{sc}t) + Cb\end{aligned}$$

The output signals of first and third multipliers 162 and 164 are added in first adder 166, the operation of which can be expressed as follows.

$$2C(\sin 2\omega_{sc}t) + 2C'(\cos 2 107_{sc}t) = 2Cb \quad (5)$$

wherein Cb is the B-Y signal output by first adder 166.

Second multiplier 163 multiplies color signal C by the carrier signal $(\cos\omega_{sc}t)$ for use in the demodulation output from the third output terminal of carrier generator 140. This can be expressed as follows.

$$\begin{aligned}C(\cos\omega_{sc}t) &= Cb(\sin\omega_{sc}t)\cos\omega_{sc}t + Cr(\cos\omega_{sc}t)\cos\omega_{sc}t \quad (6)\\ 2C(\cos\omega_{sc}t) &= -Cb(\sin2\omega_{sc}t) + Cb(\sin 0) +\\ &\quad Cr(\cos2\omega_{sc}t) + Cr(\cos 0)\\ &= -Cb(\sin2\omega_{sc}t) + Cr(\cos2\omega_{sc}t) + Cr\end{aligned}$$

The $\pi/2$-transformed color signal C', that is, an output signal of Hilbert transformer 161, is multiplied to the carrier signal $(\sin\omega_{sc}t)$ for use in demodulation in fourth multiplier 165, which can be expressed as follows.

$$\begin{aligned}C'(\sin\omega_{sc}t) &= Cb(\sin\omega_{sc}t)\cos\omega_{sc}t - Cr(\sin\omega_{sc}t)\sin\omega_{sc}t \quad (7)\\ 2C'(\sin\omega_{sc}t) &= Cb(\sin2\omega_{sc}t) + Cb(\sin 0) +\\ &\quad Cr(\cos2\omega_{sc}t) - Cr(\cos 0)\\ &= Cb(\sin2\omega_{sc}t) + Cr(\cos2\omega_{sc}t) - Cr\end{aligned}$$

The output signal of second multiplier 163 expressed in Expression (6) and the signal output via inverter 167 for inverting the output signal of fourth multiplier 165 expressed in Expression (7), are added in second adder 168.

The result can be expressed as follows.

$$2C(\cos \omega_{sc}t) + (-2C'(\sin 2\omega_{sc}t)) = 2Cr \quad (8)$$

Cr is the R-Y signal and, thus, the output of second adder 168 is R-Y.

Accordingly, in the present invention, the low-pass filter used for the conventional color demodulation circuit is removed with regard to the color signals of the chrominance subcarriers having difference frequencies and a Hilbert transformer is used, to thereby demodulate corresponding to the color signals whose chrominance subcarriers differ in the broadcasting method only by changing the $\omega_{sc}$ value.

In addition to this, the present invention is applicable in demodulating the analog or digital color signal of the video equipment, for example, a video cassette recorder or television.

As described above, a color signal demodulation circuit of the present invention and method thereof demodulate the color signal in correspondence with the chrominance subcarriers having different frequencies, without necessitating the low-pass filter for removing the harmonics components of the modulation signal, thereby simplifying the hardware.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A color signal demodulation circuit for demodulating an input modulated color signal using a carrier signal, said color signal demodulation circuit comprising:
   a carrier generator for generating a first carrier signal having sine component and a second carrier signal having cosine component, said first and said second carrier signals being synchronized with a burst signal extracted from said color signal;
   a phase delay phase delaying said input modulated color signal;
   a first demodulator for demodulating a B-Y color difference signal of a baseband using a first result of multiplying said input modulated color signal with said first carrier signal and a second result of multiplying a delayed color signal output from the phase delay by said second carrier signal; and
   a second demodulator for demodulating an R-Y color difference signal of the baseband using a third result of multiplying said input modulated color signal with said second carrier signal and a fourth result of multiplying said delayed color signal with said first carrier signal.

2. The color signal demodulation circuit according to claim 1, wherein said input modulated color signal is obtained by adding a B-Y component which is multiplied by the sine component having the same frequency as a chrominance carrier, and an R-Y component which is multiplied by the cosine component having the same frequency as the chrominance carrier.

3. A color signal demodulation circuit in a color signal processing device which includes a carrier generator for generating a first carrier signal having a sine component and a second carrier signal having a cosine component so as to demodulate an input modulated color signal into a color signal at a baseband frequency, said first and second carrier signals being synchronized with a burst signal included in the input modulated color signal, said color signal demodulation circuit comprising:
   a phase shifter for transforming the input modulated color signal into a predetermined phase-delayed color signal;
   a first multiplier for multiplying said input modulated color signal with said first carrier signal output from said carrier generator;
   a second multiplier for multiplying said input modulated color signal with said second carrier signal;

a third multiplier for multiplying said first carrier signal with said phase-delayed color signal output from said phase shifter;

a fourth multiplier for multiplying said second carrier signal with said phase-delayed color signal output form said phase shifter;

an adder for adding respective output signals of said first and fourth multipliers and outputting a B-Y color difference signal; and a subtracter for subtracting respective output signals of said second and third multipliers and outputting an R-Y difference signal.

4. The color signal demodulation circuit according to claim 3, wherein said phase shifter is a Hilbert transformer.

5. The color signal demodulation circuit according to claim 4, wherein said input modulated color signal is obtained by adding a B-Y component which is multiplied by the sine component having the same frequency as a chrominance carrier, and an R-Y component which is multiplied by the cosine component having the same frequency as the chrominance carrier.

6. A color signal demodulation circuit comprising a burst gate circuit for detecting only a color burst signal included in an input color signal, a phase difference detector for comparing phase values between the color burst signal output from said burst gate circuit and a carrier signal for use in demodulation and output of a phase difference, a carrier generator for adding the phase difference detected in said phase difference detector to the carrier signal currently being generated so as to provide carrier signals for use in demodulation synchronized with the input color signal, and a color difference signal demodulator for demodulating said input color signal into a color difference signal at a baseband frequency using said carrier signals, said color difference signal demodulator comprising:

a phase shifter for converting the input color signal into a $\pi/2$-delayed phase-delayed color signal;

a first multiplier for multiplying said color signal with a first carrier signal having a sine component output from said carrier generator;

a second multiplier for multiplying said color signal with a second carrier signal having a cosine component output from said carrier generator;

a third multiplier for multiplying said phase-delayed color signal output from said phase shifter with said first carrier signal;

a fourth multiplier for multiplying said phase-delayed color signal output from said phase shifter with said second carrier signal;

an adder for adding respective output signals of said first and fourth multipliers so as to produce a B-Y color difference signal; and a subtracter for subtracting respective output signals of said second and third multipliers so as to produce an R-Y color difference signal.

7. The color signal demodulation circuit according to claim 6, wherein said phase shifter is a Hilbert transformer.

8. The color signal demodulation circuit according to claim 6, wherein said input color signal is obtained by adding a B-Y component which is multiplied by the sine component having the same frequency as a chrominance carrier, and an R-Y component which is multiplied by the cosine component having the same frequency as the chrominance carrier.

9. The color signal demodulation circuit according to claim 6, further comprising a delay time compensator for delaying the input color signal applied to said phase shifter by a predetermined time.

10. A color signal demodulation method for demodulating an input modulated color signal using a carrier signal, said method comprising the steps of:

(a) generating a first carrier signal having a sine component that is phase-synchronized with a burst signal of said input modulated color signal and a second carrier signal having a cosine component;

(b) phase delaying the input modulated color signal;

(c) demodulating a B-Y color difference signal at a baseband frequency using a first result of multiplying said input modulated color signal with said first carrier signal and a second result of multiplying a delayed color signal output during said step (b) with said second carrier signal; and (d) demodulating an R-Y color difference signal at the baseband frequency using a third result of multiplying said input modulated color signal with said second carrier signal and a fourth result of multiplying said delayed color signal with said first carrier signal.

11. A color signal demodulation method for a color signal processing device which includes carrier generator for generating a first carrier signal having a sine component and a second carrier signal having a cosine component synchronized with a burst signal loaded on an input color signal, said method comprising the steps of:

(a) phase shifting the input color signal into a predetermined phase delayed color signal;

(b) multiplying said first carrier signal output from said carrier generator with said input color signal;

(c) multiplying said second carrier signal with said input color signal;

(d) multiplying said first carrier signal with said phase-delayed color signal;

(e) multiplying said second carrier signal with said phase-delayed color signal;

adding respective output signals of said steps (b) and (e) to thereby generate a B-Y color difference signal; and subtracting an output signal of said step (d) from an output signal of said step (c) to thereby generate a R-Y color difference signal.

* * * * *